US012695615B2

(12) United States Patent
Goodman et al.

(10) Patent No.: US 12,695,615 B2
(45) Date of Patent: Jul. 28, 2026

(54) DEVICE ONBOARDING IN DISTRIBUTED SYSTEMS USING META PAYLOADS

(71) Applicant: Dell Products L.P., Round Rock, TX (US)

(72) Inventors: Bradley K. Goodman, Nashua, NH (US); Joseph Caisse, Burlington, MA (US); James Daniel Harms, Worthington, OH (US); John Jian Li, Westford, MA (US)

(73) Assignee: Dell Products L.P., Round Rock, TX (US)

( * ) Notice: Subject to any disclaimer, the term of this patent is extended or adjusted under 35 U.S.C. 154(b) by 35 days.

(21) Appl. No.: 18/643,268

(22) Filed: Apr. 23, 2024

(65) Prior Publication Data

US 2025/0330317 A1 Oct. 23, 2025

(51) Int. Cl.
*H04L 29/06* (2006.01)
*H04L 9/30* (2006.01)
*H04L 9/32* (2006.01)

(52) U.S. Cl.
CPC . *H04L 9/32* (2013.01); *H04L 9/30* (2013.01)

(58) Field of Classification Search
CPC . H04L 9/32; H04L 9/30; H04L 1/0005; H04L 1/0011; H04L 1/0089; H04L 63/0245; H04L 63/0471; H04L 2209/76; H04L 63/08; H04L 63/0884; H04N 21/25; H04N 21/25816; H04N 2201/3239; H04N 2201/324; H04N 21/6334; H04N 21/4508; H04N 21/65; H04Q 2213/13515; H04Q 2213/13526; H04W 12/00; H04W 8/00; H04W 28/00; H04W 28/09; G03G 21/1892; G06F 21/30; G06F 21/44; G06F 21/445;
(Continued)

(56) References Cited

U.S. PATENT DOCUMENTS 10,977,367 B1 4/2021 Adler
11,153,297 B2 10/2021 Aronov
(Continued)

OTHER PUBLICATIONS

Stevens, Kevin et al., "BluePrint: Automatic Malware Signature Generation for Internet Scanning.", Proceedings of the 27th International Symposium on Research in Attacks, Instructions and Defenses. 2004, pp. 197-214 (18 pages).
(Continued)

*Primary Examiner* — Edward Zee
*Assistant Examiner* — Leynna Truvan
(74) *Attorney, Agent, or Firm* — WOMBLE BOND DICKINSON (US) LLP

(57) ABSTRACT

Methods and systems for managing endpoint devices are disclosed. The endpoint devices may be managed by onboarding them. To onboard the endpoint devices, ownership vouchers may include information that directs the endpoint device to a meta payload that contains a link to a bootable installer and/or disk image and authentication data that is used to verify an integrity of the bootable installer and/or disk image. The meta payload may be stored at a location different from where the bootable installer and/or disk image are stored. Changes to the bootable installer and/or disk image would not require regeneration of every ownership voucher that referenced the previous version of the bootable installer and/or disk image before the changes.

20 Claims, 11 Drawing Sheets

(58) Field of Classification Search
CPC .............. G06F 16/2272; G06F 16/328; G06Q
20/3674; G06Q 20/409; G06Q 20/4097;
G01S 2205/007; G03F 7/70491
See application file for complete search history.

(56) References Cited

U.S. PATENT DOCUMENTS

| | | | |
|---|---|---|---|
| 11,853,429 | B2 | 12/2023 | Volos et al. |
| 12,015,721 | B1 | 6/2024 | Kumar |
| 2005/0044197 | A1 | 2/2005 | Lai |
| 2017/0039373 | A1 | 2/2017 | Sasin |
| 2017/0123812 | A1 | 5/2017 | Voigt |
| 2017/0228562 | A1 | 8/2017 | Guilley |
| 2018/0285567 | A1 | 10/2018 | Raman |
| 2020/0151336 | A1 | 5/2020 | Maletsky et al. |
| 2020/0341597 | A1 | 10/2020 | Cannata |
| 2022/0109581 | A1 | 4/2022 | Ledworowski |
| 2022/0366061 | A1 | 11/2022 | Spivack |
| 2023/0087829 | A1 | 3/2023 | Ponnuru |
| 2023/0325509 | A1 | 10/2023 | Schroder et al. |
| 2023/0343229 | A1* | 10/2023 | Shapira .................... G08G 5/55 |
| 2024/0333704 | A1* | 10/2024 | Atur .................... H04L 63/0807 |
| 2025/0094591 | A1 | 3/2025 | Balin |
| 2025/0175344 | A1 | 5/2025 | Wittenauer |

OTHER PUBLICATIONS

Fierrez-Aguilar, Julian et al., "Target dependent score normalization techniques and their application to signature verification", IEEE Transactions on Systems. Man, and Cybernetics, Part C (Application and Reviews) vol. 35, No. 3, 2005, pp. 418-425 (8 pages).

* cited by examiner

DEVICE ONBOARDING IN DISTRIBUTED SYSTEMS USING META PAYLOADS

FIELD

Embodiments disclosed herein relate generally to device management. More particularly, embodiments disclosed herein relate to systems and methods to manage onboarding of devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components, and hosted entities such applications, may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
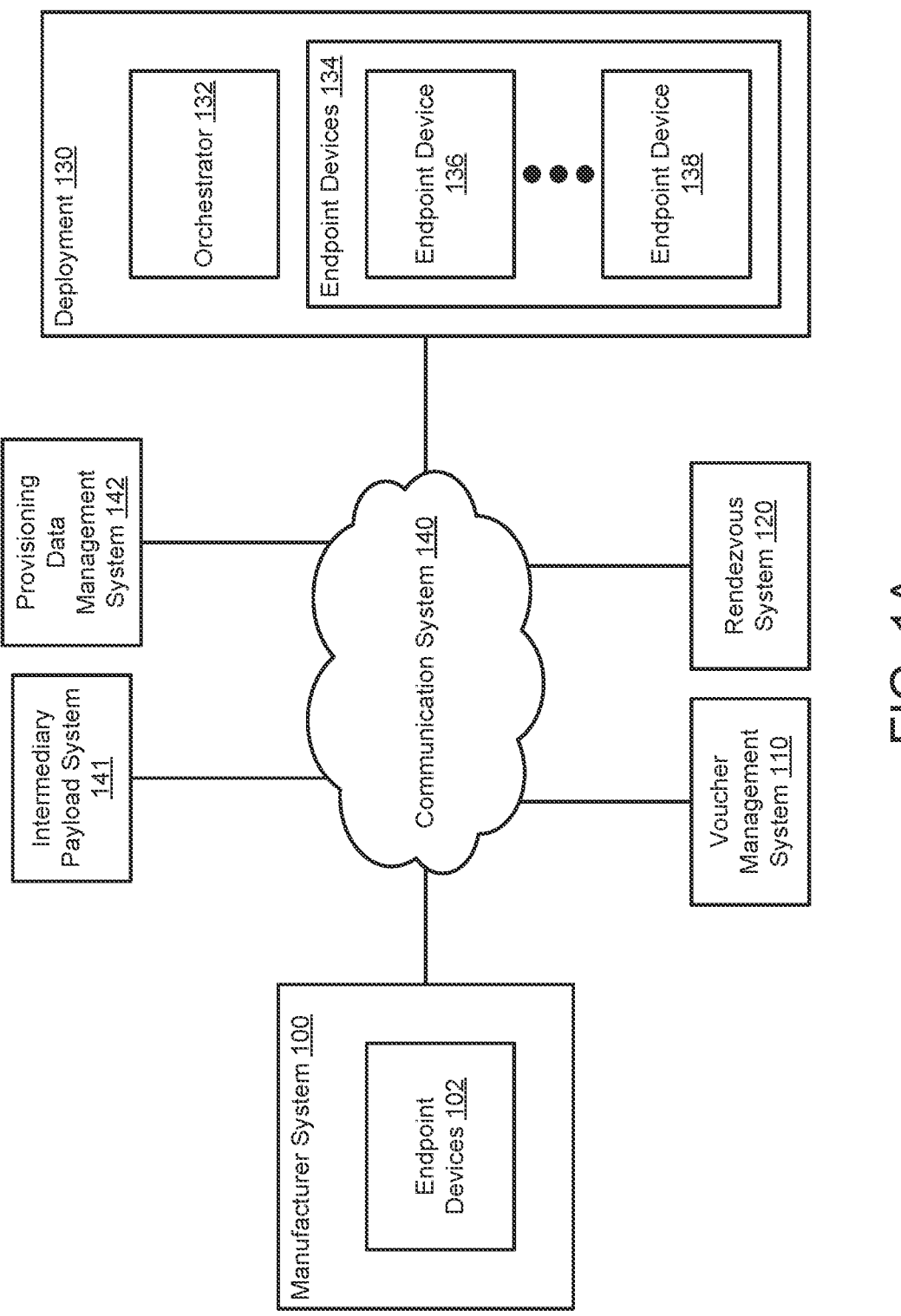
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing authority in a distributed system. To manage authority, endpoint devices may be onboarded.

During onboarding, authority over the endpoint devices may be established. To establish the authority, ownership vouchers, and/or other data structures may be presented to the endpoint devices. The endpoint devices may utilize these data structures to identify the entities that have authority over the endpoint devices.

These ownership vouchers may also contain information and/or data (e.g., provisioning data) that can be used by the endpoint devices to complete the onboarding. For example, these ownership vouchers may be configured to include authentication data (e.g., a hash, a checksum, a digest, a trusted public key (e.g., if the provisioning data is signed using a secret key), etc.) for a bootable installer and/or disk image (e.g., a preboot execution environment (PXE) image such as Windows™ Preinstallation Environment (WinPE) images, extensible firmware interface (EFI) images, International Organization for Standardization (ISO) images, or the like), a link (e.g., a uniform resource locator (URL) or the like) to the bootable installer and/or disk image, and/or the actual bootable installer and/or disk image itself.

In such situations, any changes to such embedded bootable installer and/or disk image would require regeneration of every ownership voucher that may have ever referenced and/or included the version of the bootable installer and/or disk image prior to the changes. For example, after an ISO image's content has been changed, a hash that was generated for the version of the ISO image prior to the change would no longer be valid for authenticating the new version of the ISO image. Such regeneration of every ownership voucher can not only cause security issues (e.g., loss of authority if certain information is missed and/or regenerated incorrectly, or the like) but can also cause onboarding complications and/or failures if the appropriate ownership vouchers are not regenerated because one or more changes to the bootable installer and/or disk image were not detected or appropriately reported.

To avoid such regeneration of ownership vouchers when changes are made to bootable installers and/or disk images, a meta payload (also referred to herein an "intermediary payload") may be created to store the above-discussed data associated with these bootable installers and/or disk images. The ownership voucher would then only need to store information (e.g., a URL or the like) that points (e.g., directs) the endpoint device to the meta payload. As a result, any changes to the bootable installer and/or disk image would only affect the meta payload but would not affect the ownership voucher (as long as the information that points the endpoint device to the meta payload remains accurate).

For improved security, the meta payload may be signed using a secret key associated with an owner and/or administrator of the meta payload. The ownership voucher may be provided, along with the information that points the endpoint device to the meta payload, with a trusted public key that be used to verify the signed meta payload (e.g., a key referenced by the signed meta payload).

Additionally, use of such meta payload may also improve the versatility of such ownership vouchers. More specifically, because the bootable installer and/or disk image is now stored elsewhere, the bootable installer and/or disk image may be stored in any format (e.g., WinPE, EFI, ISO, or the like) desired by the entity providing the image.

Accordingly, embodiments disclosed herein may address, among others, the above-discussed technical problem of distributing (e.g., specifying) bootable installer and/or disk image information in ownership vouchers of endpoint devices. The disclosed embodiments may do so by using meta payloads, instead of the ownership vouchers, to store such information.

In an embodiment, a method for managing an endpoint device of endpoint devices in a deployment is provided. The method may include: during an onboarding of the endpoint device and by the endpoint device: obtaining, from an intermediary payload system remote to the endpoint device, an intermediary payload comprising a provisioning data locator and provisioning data authentication data; using the provisioning data locator to obtain provisioning data from a provisioning data management system remote from the endpoint device; and executing the provisioning data to complete the onboarding of the endpoint device.

Obtaining the intermediary payload may include: obtaining, from a bare metal orchestration (BMO) payload included in an ownership voucher of the endpoint device, an intermediary payload locator; and using the intermediary payload locator to locate the intermediary payload system and the intermediary payload within the intermediary payload system.

The intermediary payload is signed using a secret key, and prior to using the provisioning data locator to obtain the provisioning data: obtaining a trusted public key associated with the intermediary payload from the BMO payload; and determining that the trusted public key is referenced by the intermediary payload signed using the secret key to validate an integrity of the intermediary payload.

Obtaining the provisioning data comprises using the provisioning data locator to locate the provisioning data management system and the provisioning data within the provisioning data management system. After obtaining the provisioning data from the provisioning data management system, using the provisioning data authentication data to validate the provisioning data obtained from the provisioning data management system.

The provisioning data is only executed by the endpoint device after the provisioning data is successfully validated using the provisioning data authentication data.

The provisioning data authentication data is at least one of a hash, a digest, or a checksum of the provisioning data.

The provisioning data locator comprises a uniform resource locator (URL) that specifies a location of the provisioning data and the intermediary payload locator comprises a URL that specifies a location of the intermediary payload.

The ownership voucher is provided to the endpoint device by an orchestrator controlled by an owner of the endpoint device, and the ownership voucher is provided without the provisioning data, the provisioning data locator, and the provisioning data authentication data within other content of the ownership voucher beside the BMO payload.

The method may further include: prior to obtaining the intermediary payload and by the endpoint device: obtaining, from the orchestrator, a work order comprising instructions for onboarding the endpoint device using the provisioning data; and using the BMO payload in the ownership voucher instead of data included in the work order to obtain the intermediary payload.

The work order is also provided without the provisioning data, the provisioning data locator, and the provisioning data authentication data in the work order.

Both of the provisioning data management system and the intermediary payload system are separate and distinct from the orchestrator.

The provisioning data management system is remote to the intermediary payload system and the endpoint device.

In an embodiment, a non-transitory media is provided. The non-transitory media may include instructions that when executed by a processor cause the computer-implemented method to be performed.

In an embodiment, a data processing system (e.g., an endpoint device) is provided. The data processing system may include the non-transitory media and a processor, and may perform the method when the computer instructions are executed by the processor.

Turning to FIG. 1A, a block diagram illustrating a system in accordance with an embodiment is shown. The system shown in FIG. 1A may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, any number of endpoint devices may be deployed to a deployment. The endpoint devices may cooperatively provide the computer implemented services.

To manage the endpoint devices to provide the computer implemented services, authority over the endpoint devices may need to be established. In other words, the endpoint devices must be able to ascertain that they are under the authority of a particular entity. Based on this authority, the entity may, for example, issue work order and/or other types of instructions to manage the operation of the endpoint devices to provide desired computer implemented services.

To facilitate ascertaining of the authority over them, the endpoint devices may utilize secrets. The secrets may allow the endpoint devices to cryptographically verify delegations of authority over the endpoint devices from a root of trust (e.g., a trusted key of a manufacturer) to another entity (e.g., an owner).

Overtime the resources requirements for providing computer implemented services may change and/or endpoint devices may need to be replaced. For example, additional services may be desired to be provided, different types of services may be desired to be provided, etc. In another example, an endpoint device that contributed to the computer implemented services may cease to operate thereby reducing the quantity of resources available to provide the computer implemented services. To satisfy the resource requirements based on these changes to an exist systems, additional endpoint devices may be onboarded and thereby contribute to the resources available to provide the computer implemented services.

However, onboarding an endpoint device may require access to bootable installer and/or disk image that are to be executed by the endpoint devices to complete the onboarding process. In general, embodiments disclosed herein may provide methods, systems, and/or devices for managing endpoint devices to improve an onboarding process of the endpoint devices.

To improve the onboarding process and provide these endpoint devices with such bootable installers and/or disk images, ownership vouchers of endpoint devices may be configured to include information that directs the endpoint device to a meta payload containing a link to one or more bootable installers and/or disk images and authentication data that is used to verify an integrity of the bootable installers and/or disk images.

The meta payload may be stored at a location different from where the bootable installers and/or disk images are stored. Changes to the bootable installers and/or disk images would advantageously not require regeneration of every ownership voucher that referenced the previous version of the bootable installer and/or disk image before the changes.

To provide the above noted functionality, the system of FIG. 1A may include manufacturer system 100, voucher management system 110, rendezvous system 120, deployment 130, communication system 140, intermediary payload system 141, and provisioning data management system 142. Each of these components is discussed below.

Manufacturer system 100 may be a system used by a manufacturer of endpoint devices 102. Manufacturer system 100 may include, for example, factories, assembly plants, distribution facilities, and/or other types of facilities for creating endpoint devices 102. Endpoint devices 102 may be data processing systems which may be usable to provide various computer implemented services.

When manufactured, manufacturer system 100 may put endpoint devices 102 in condition for subsequent onboarding to various deployments (e.g., 130) and/or other environments (e.g., data centers, edge systems, etc.) in which endpoint devices may be positioned to provide desired computer implemented services.

Figure 1B:
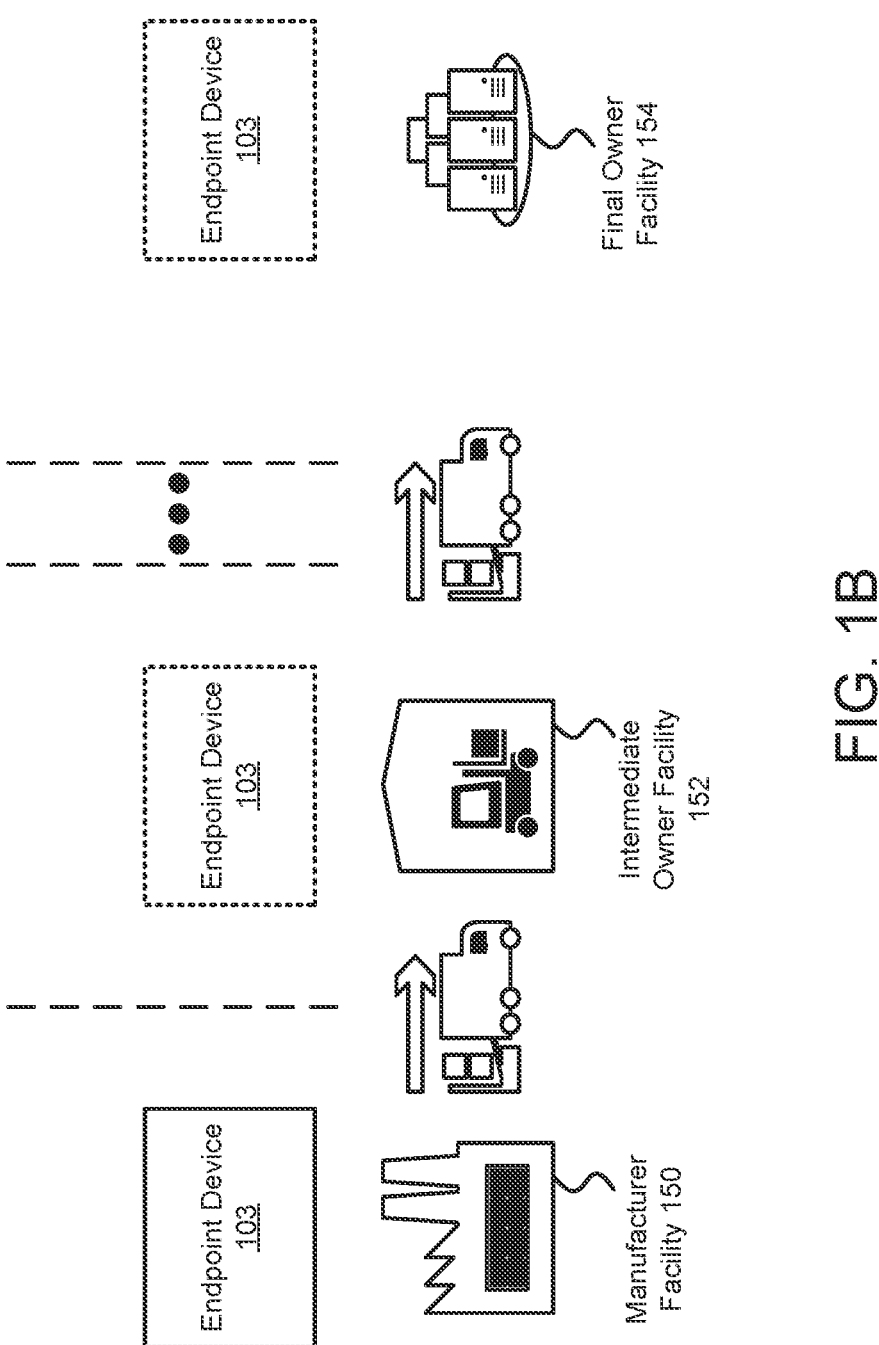
FIGS. 1B-1K show diagrams illustrating aspects of operation of the system of FIG. 1A in accordance with an embodiment.
Figure 1C:
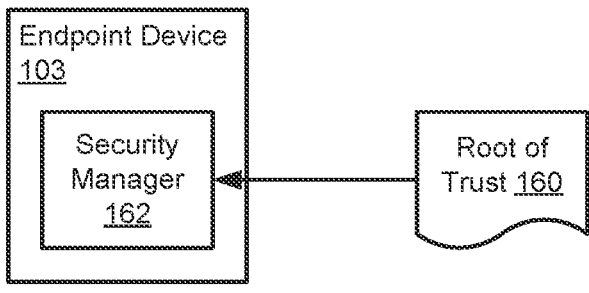

To place endpoint devices 102 in condition for subsequent onboarding, manufacturer system 100 may (i) establish a root of trust for each endpoint device, (ii) record various information regarding the endpoint devices (e.g., hardware/software loadout, identifiers of various components positioned therein, etc.), and (iii) install various pieces of software, establish various configuration settings, update various hardware components, and/or perform other actions so that only entities to which authority over the endpoint devices has been delegated from the root of trust are able to control and/or otherwise use the endpoint device. Refer to FIG. 1C for additional details regarding establishing a root of trust for the endpoint device.

Once constructed, endpoint devices 102 may be sold directly to end users and/or placed into the stream of commerce (e.g., sold to resellers, etc.) and through which endpoint devices 102 eventually reach end users. Refer to FIG. 1B for additional details regarding how endpoint devices may reach end users (e.g., individuals, organizations, etc.).

As ownership over the endpoint devices changes, information regarding the changes in ownership and/or authority may be recorded in an ownership voucher. The ownership voucher may allow an end user to establish authority over the endpoint device such that the endpoint device will be usable by the end user.

Voucher management system 110 may document and manage information regarding changes in ownership and authority over endpoint devices 102. To do so, voucher management system 110 may generate ownership vouchers. An ownership voucher may be a cryptographically verifiable data structure usable to establish which entities have authority over endpoint devices 102.

For example, an ownership voucher may include certificate chains that documents the changes in ownership and authority over endpoint devices 102. Each certificate may be signed using various keys. The keys used to sign (e.g., private keys) and keys included in (e.g., public keys) in ownership vouchers may enable endpoint devices to ascertain whether to trust various data structures, such as work orders which may be signed. Refer to FIGS. 1D-1I for additional information regarding ownership vouchers.

The ownership voucher may also be configured to include information regarding bootable installers and/or disk images to be used (e.g., executed) by the endpoint devices as part of the onboarding process. Such information may include, but is not limited to: authentication data (e.g., a hash, a checksum, a digest, a trusted public key (e.g., if the provisioning data is signed using a secret key), etc.) for a bootable installer and/or disk image (e.g., a preboot execution environment (PXE) image such as Windows™ Preinstallation (WinPE) images, extensible firmware interface (EFI) images, International Organization for Standardization (ISO) images, or the like), a link (e.g., a uniform resource locator (URL) or the like) to the bootable installer and/or disk image, the actual bootable installer and/or disk image itself, or the like.

When one of endpoint devices 102 is obtained by an end user, the end user may add the endpoint devices to a collection such as deployment 130. When so added, an orchestrator (e.g., 132) or other entity may utilize a corresponding ownership voucher from voucher management system 110 to establish authority over the endpoint device. In this manner, any number of endpoint devices (e.g., 134) may be onboarded and brought under the control of a control plane which may include any number of orchestrators (e.g., 132). Different endpoint devices (e.g., 136, 138) may be onboarded at different points in time and/or for different purposes.

However, the ownership voucher provided by voucher management system 110 may delegate authority over the endpoint device to the end user by establishing a public key of a public private key pair maintained by the end user (e.g., via the orchestrator 132) as having been delegated authority over the endpoint device. To issue verifiable work orders or other types of instructions to the endpoint device, the work order may need to be signed by the private key of the public private key pair.

When one of endpoint devices 102 initially powers on after manufacturing, the endpoint device may reach out to rendezvous system 120. Rendezvous system 120 may be a system that directs endpoint devices to entities such as orchestrator 132 that will onboard the endpoint devices.

To do so, the entities such as orchestrator 132 may provide rendezvous system 120 with information usable to authenticate that orchestrator 132 will manage the endpoint devices. For example, orchestrator 132 may provide information from ownership vouchers, and/or other sources to rendezvous system 120. Once verified, rendezvous system 120 may redirect endpoint devices to the corresponding entities when the endpoint devices reach out to rendezvous system 120 after being powered on.

Once onboarded, endpoint devices 134 may perform various operations to complete onboarding. The operations may include any number and type of operation (e.g., configuration operations, security operations, software installation operations, account establishment operations, etc.), and the operations may be directed by orchestrator 132. Once onboarded, the endpoint devices may begin to contribute to computer implemented services by deployment 130. Such operations may require the retrieval and execution of the discussed bootable installers and/or disk images.

An intermediary payload system 141 may be configured to store an intermediary payload (also referred to herein as a "meta payload") that stores information pertaining to these bootable installers and/or disk images (and/or other provisioning data). Additional details regarding the intermediary payload are discussed below in reference to FIGS. 1J-1K.

A provisioning data management system 142 may be configured to store actual copies of the bootable installers and/or disk images. In addition to the bootable installers and/or disk images, the provisioning data management system 142 may also store copies of any and all types of provisioning data necessary for endpoint devices 134 to complete onboarding and start providing computer-implemented services. In embodiments, the provisioning data (including the bootable installers and/or disk images) may also be stored in the intermediary payload system 141.

When providing their functionality, any of manufacturer system 100, endpoint devices 102, voucher management system 110, rendezvous system 120, deployment 130, orchestrator 132, endpoint devices 134, intermediary payload system 141, and/or provisioning data management system 142 may perform all, or a portion, of the processes, interactions, and methods illustrated in FIGS. 1B-3.

Any of manufacturer system 100, endpoint devices 102, voucher management system 110, rendezvous system 120, deployment 130, orchestrator 132, endpoint devices 134, intermediary payload system 141, and/or provisioning data management system 142 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), and edge device, an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 140. Communication system 140 may facilitate communications between the components of FIG. 1A. In an embodiment, communication system 140 includes one or more networks that facilitate communication between any number of components. The networks may include wired networks and/or wireless networks (e.g., and/or the Internet). The networks and communication devices may operate in accordance with any number and types of communication protocols (e.g., such as the Internet protocol).

While illustrated in FIG. 1A as including a limited number of specific components, a system in accordance with an embodiment may include fewer, additional, and/or different components than those illustrated therein.

As discussed above, endpoint devices (e.g., 102) may traverse through a stream of commerce between when the endpoint devices are manufactured and when the endpoint devices reaches a final owner. Turning to FIG. 1B, diagram of an example path through a stream of commerce in accordance with an embodiment is shown.

In FIG. 1B, vertical dashed lines indicate different geographic locations in which various facilities may be positioned. Representations of such facilities (e.g., 150-154) may be positioned below the pages. Representations of movement of endpoint devices between these facilities is illustrated using truck shaped images. Some instances of the graphical representation of endpoint device 103 are illustrated using dashed outlining to indicate that endpoint device 103 may only be present at one of the facilities at any point in time, and the instance of the graphical representation of endpoint device 103 drawn in solid outlining indicates where endpoint device 103 is located in the example shown in FIG. 1B.

The stream of commerce may begin, for example, at manufacturer facility 150. Manufacturer facility 150 may be a facility operated by a manufacturer of endpoint devices. During manufacturing, the manufacturer may establish a root of trust for an endpoint device (e.g., 103). Refer to FIG. 1C for additional details regarding establishing the root of trust for endpoint device 103. The root of trust may be used by endpoint device 103 to discern which entities have authority over it, which entities to trust, and/or for other purposes. The initial root of trust may indicate that the manufacturer is the owner of and has authority over endpoint device 103.

Once the root of trust is established, endpoint device 103 may be sold and resold to various intermediate owners. These intermediate owners may operate various intermediate owner facilities (e.g., 152), such as warehouses, distribution centers, sales rooms, etc. When sold, endpoint device 103 may be shipped to these various facilities.

Finally, once purchased from an intermediate owner, a final owner may operate a final owner facility (e.g., 154), such as a data center, edge deployment, and/or other type of computer deployment to which endpoint device 103 may be onboarded. To facilitate onboarding, voucher management system 110 may collect and add information regarding changes in ownership of endpoint device 103 to an ownership voucher. Orchestrator 132 may use the ownership voucher to establish authority over endpoint device 103.

Turning to FIG. 1C, a diagram of an example process for establishing a root of trust in endpoint device 103 in accordance with an embodiment is shown. To establish a root of trust, when endpoint device 103 is manufactured, root of trust 160 may be installed in endpoint device 103.

Root of trust 160 may be a public key of a public private key pair controlled by the manufacturer of endpoint device 103. The public private key pair may be established using any process.

To install root of trust 160, root of trust 160 may be stored in endpoint device 103. The storage location and security precautions taken with respect to storing root of trust 160 may vary depending on the architecture of endpoint device 103.

For example, endpoint device 103 may host or include a security manager (e.g., 162). Security manager 162 may be implemented using a discrete hardware component, or may be a software component. Security manager 162 may enforce various security policies on endpoint device 103. For example, the security policies may require that endpoint device 103 validate authority over it back to root of trust 160 before complying with any instructions from other entities that allege to have authority over endpoint device 103.

To validate entities having authority over endpoint device 103, endpoint device 103 may utilize ownership vouchers.

Figure 1D:
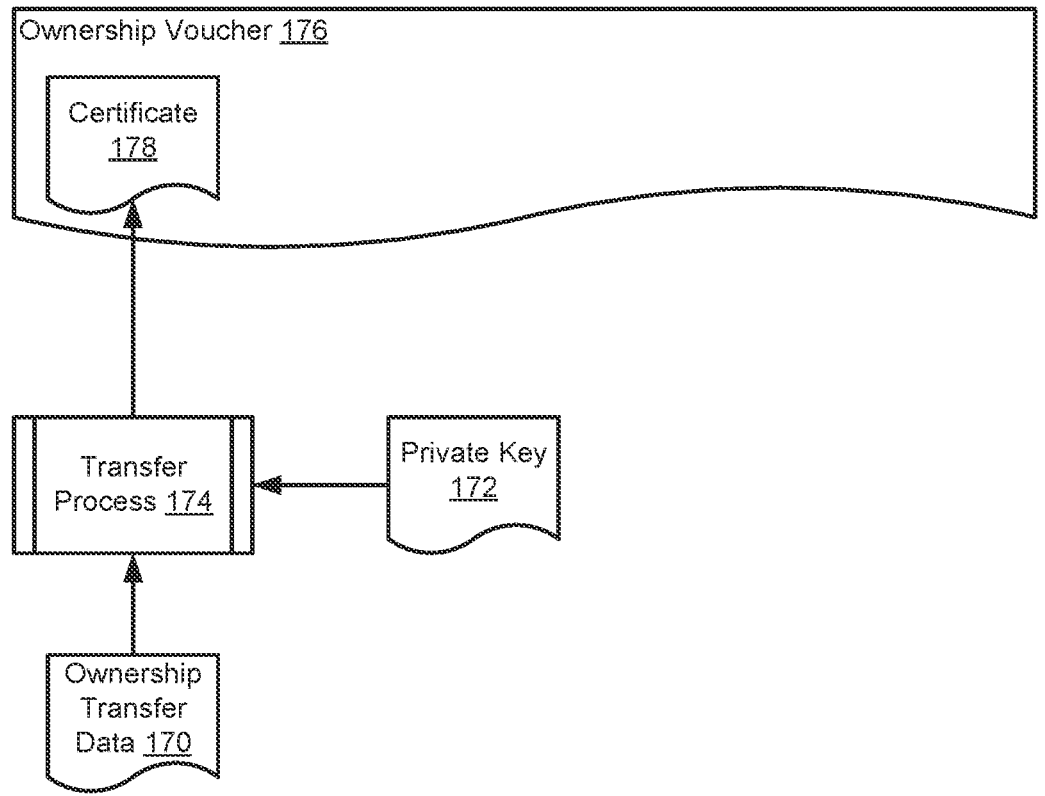
Figure 1E:
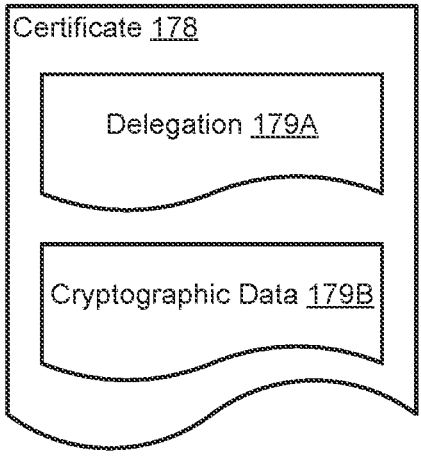

Turning to FIG. 1D, a diagram of an example process for generating ownership voucher 176 in accordance with an embodiment is shown. To generate ownership voucher 176, information regarding changes in ownership and authority over an endpoint device may be added. The information may take the form of a cryptographically verifiable certificate (e.g., 178). Refer to FIG. 1E for additional information regarding certificate 178.

To add a certificate to ownership voucher 176, transfer process 174 may be performed. During transfer process 174, ownership transfer data 170 and private key 172 may be obtained. Ownership transfer data 170 may document a change in ownership and/or authority over an endpoint device. For example, when an endpoint device is sold, a public key of a public private key pair controlled by the purchaser may be added to ownership transfer data 170, along with other types of information regarding the transfer. This public key may be usable to verify signed work orders or other signed data structures from the new owner (e.g., the new owner may be able to use the corresponding private key for signing). The information in ownership transfer data 170 may be treated as a delegation statement, which an endpoint device may parse to identify entities having authority over it.

Figure 1F:
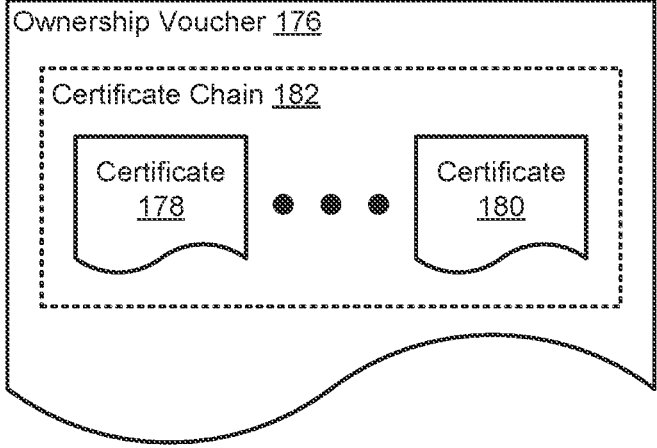
Figure 1G:
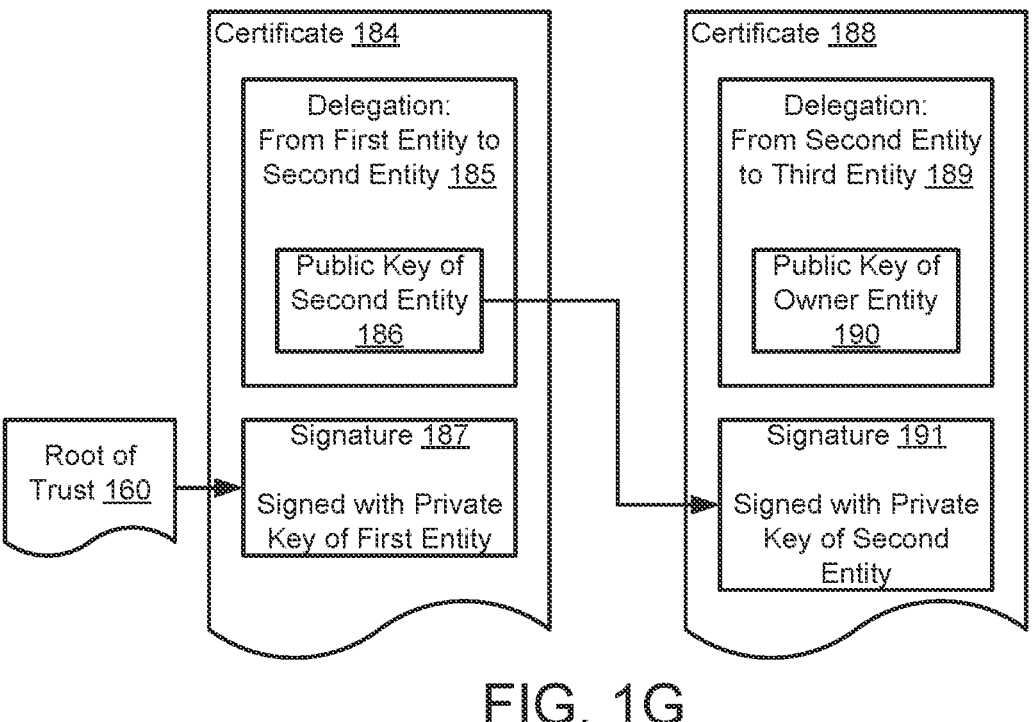
Figure 1H:
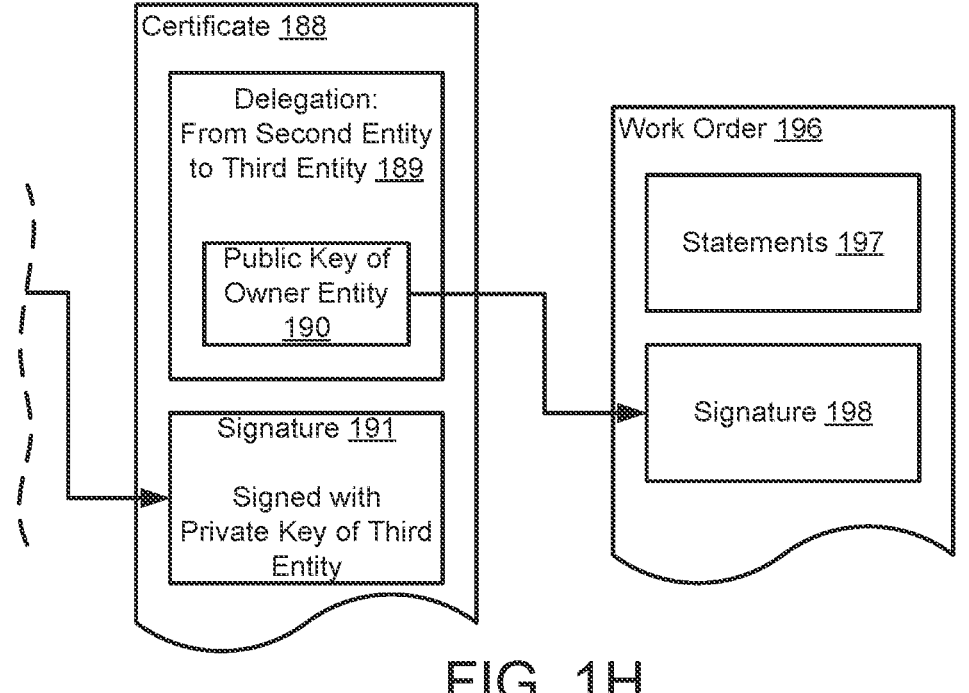

Private key 172 may be a private key of a public private key pair controlled by an entity that has authority over an endpoint device at the time authority over the endpoint device changes (e.g., via sale or other mechanism). In a scenario in which the manufacturer is the seller, the private key corresponding to the root of trust may be private key 172. Similarly, in a scenario in which an intermediate owner is the seller, private key 172 may be the private corresponding to the public key included in the delegation statement in ownership voucher 176 that establishes the intermediate owner has the owner of the endpoint device. In other words, to establish a delegation of authority, the entity that has authority over the endpoint device as defined by the certificates of ownership voucher 176 may need to sign the ownership transfer data 170 to further delegate ownership and authority over the endpoint device. By doing so, a chain of delegations that are cryptographically verifiable back to the root of trust may be established. Refer to FIGS. 1F-1H for additional details regarding establishing chains of delegations.

Any number of certificates may be added to ownership voucher 176 thereby enabling certificate chains that establish chains of delegation from the root of trust for an endpoint device. Ownership voucher 176 may, as discussed above, be used during onboarding.

Turning to FIG. 1E, a diagram of an example certificate 178 in accordance with an embodiment is shown. Certificate 178 may include delegation 179A and cryptographic data 179B.

Delegation 179A may include information documenting a delegation of authority/ownership over an endpoint device. For example, delegation 179A may include a public key, and indicate what is delegated to the entity that has control over the public private key pair of which the public key is a member. The extent of what is delegated may be specified at a macro level (e.g., ownership) or a micro level (e.g., limited authority).

Cryptographic data 179B may include signature usable to verify the integrity of delegation 179A and ascertain whether delegation 179A is valid.

To determine whether certificate 178 includes a valid delegation, an endpoint device may attempt to establish a chain of delegations back to the root of trust.

Turning to FIG. 1F, a diagram of an example certificate chain 182 of ownership voucher 176 in accordance with an embodiment is shown. Certificate chain 182 may be a series of certificates that can be sequentially validated back to the root of trust. To sequentially validate the certificate back to the root of trust, the first certificate (e.g., 178) in the chain may attempt to be validated using the root of trust (e.g., a public key). Thus, the first certificate in the chain may only be validated if the private key (e.g., controlled by the manufacturer) corresponding to the root of trust was used to sign certificate 178. Other certificates in the chain may be similarly validated by using the public key from the delegation statement of the previous certificate to check the signature in the next certificate in the chain. Certificate chain 182 may include any number of certificates (e.g., 178 through 180) that can be sequentially verified back to the root of trust. Refer to FIGS. 1G-1H for additional information regarding establishing valid certificate chains.

Turning to FIG. 1G, a diagram of an example process for validating a portion of a certificate chain of an ownership voucher in accordance with an embodiment is shown. In FIG. 1G, two certificates (e.g., 184, 188) from a certificate chain are shown.

As seen, certificate 184 may include delegation 185 which includes a public key (e.g., 186) of a second entity. The delegation statement may indicate that a first entity is delegating authority to the second entity.

Certificate 184 may include signature 187. Signature 187 may be generated using a private key controlled by the first entity that delegated authority to the second entity. In this example, the private key may correspond to root of trust 160 (e.g., may be a private corresponding to the public key installed when an endpoint device is manufactured).

To establish a certificate chain, signature 187 may be checked using root of trust 160. If verified as having been signed using the private key corresponding to the root of trust, then certificate 184 may be treated as being valid.

Like certificate 184, certificate 188 may include delegation 189 which includes a public key (e.g., 190) of a third entity, and in this example the owner. The delegation statement of delegation 189 may indicate that the second entity is delegating authority to the third entity (i.e., the owner).

Certificate 188 may include signature 191. Signature 91 may be generated using a private key controlled by the second entity that delegated authority to the third entity. In this example, the private key may correspond to the public key (e.g., 186) of the second entity which may be included in delegation 185.

To extend the certificate chain, signature 191 may be checked using public key of second entity 186. If verified as having been signed using the private key corresponding to public key of second entity 186, then certificate 188 may be treated as being valid.

Once the chain is established, the delegations (e.g., 185, 189) in the chain may be parsed to identify keys to which authority has been delegated from root of trust 160. These public key may then be used to decide whether various work orders are valid, which entities have authority of an endpoint device, and/or for other purposes.

For example, during onboarding, an endpoint device may evaluate whether to perform various work orders using the keys to which authority has been delegated.

Turning to FIG. 1H, a diagram of an example process for validating a work order in accordance with an embodiment is shown. In FIG. 1H, only a portion of the certificates (e.g., 184, 188) shown in FIG. 1G are shown for clarity.

When a work order (e.g., 196) is received by an endpoint device, the endpoint device may evaluate whether the entity issuing the work order has authority over the endpoint device. To do so, the endpoint device may parse the certificates to identify the public keys to which authority over the endpoint device has been delegated.

The endpoint device may then, using the keys, check a signature (e.g., 198) included in the work order. If the signature can be verified as having been generated using the private key corresponding to one of the public keys to which authority over the endpoint device has been delegated, then the endpoint device may treat work order 196 as having been issued by an entity with authority over it. For example, signature 198 may be checked using public key of owner entity 190, in this example.

The endpoint device may then, for example, process various statements 197 included in work order 196, and take action based on those statements. These statements may include instructions that change the manner of operation of the endpoint device to, for example, comply with security requirements of a new owner, and/or perform other actions.

Figure 1I:
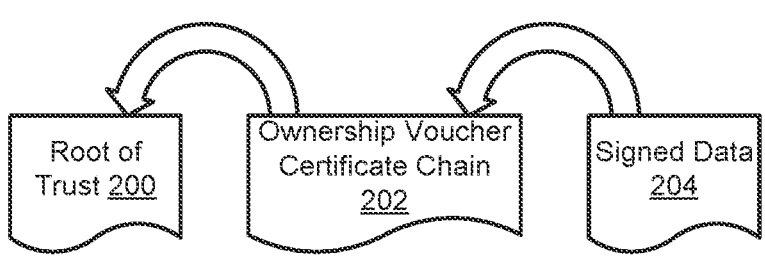

For example, turning to FIG. 1I which shows a diagram in accordance with an embodiment, signed data 204 such as a work order may be validated if public keys included in ownership voucher certificate chains (e.g., 202) correspond to private keys to which the work order issuing entity has access. In this example, ownership voucher certificate chain 202 may be used to establish delegations of authority from root of trust 200 for an endpoint device to the keys used to sign signed data 204.

Figure 1J:
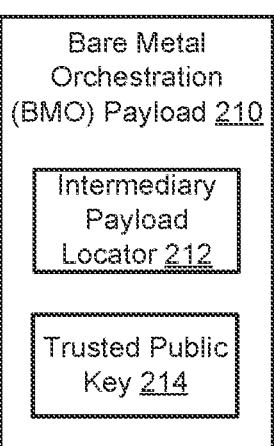

Turning now to FIG. 1J, FIG. 1J shows an example of a bare metal orchestration (BMO) payload 210. The BMO payload 210 may include an intermediary payload locator 212 and a trusted public key 214. The intermediary payload locator 212 may include any type of information (e.g., a URL, a link, an identifier, a file path, a network path, or the like) that would direct an endpoint device (e.g., endpoint device 136) that is being onboarded to an intermediary payload (e.g., intermediary payload 220 of FIG. 1K). For example, the intermediary payload locator 212 may include a URL to the intermediary payload system 141 (and a file path to a location within the intermediary payload system 141 in which the intermediary payload is stored).

The trusted public key 214 may (similar to public kay of second entity 186 and public key of owner entity 190) be a public key of a public private key pair. The private key (also referred to herein as a "secret key") of the public private key pair may be used to sign the intermediary payload 220. In embodiments, using the certificate chain of FIGS. 1G-1H as an example, the trusted public key 214 may be the same key as the public key of a current owner (e.g., public key of owner entity 190 shown in FIG. 1H) of the endpoint device while the secret key may be the key used to sign signature 198 of work order 196. Alternatively, the public private key pair may be different keys (e.g., a public private key pair of an entity who owns the provisioning data and/or the bootable installers and/or disk images stored in the provisioning data management system 142 that is the same or different from the current owner of the endpoint device).

In embodiments, the BMO payload 210 may be included in the ownership voucher 176. For example, the BMO payload 210 may be included as another certificate (e.g., certificate 178 through 180) within the ownership voucher 176. The BMO payload 210 may also be included in any of the certificates (e.g., 184, 188 shown in FIGS. 1G-1H) that are already included in the ownership voucher 176.

Figure 1K:
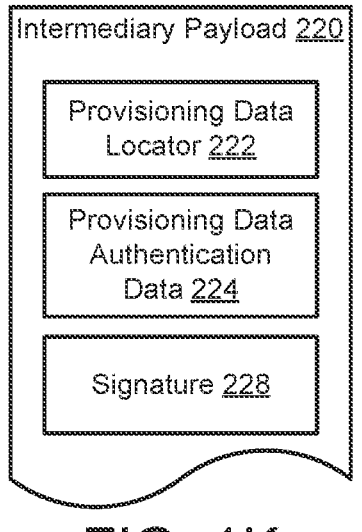

FIG. 1K shows an example of an intermediary payload 220. Intermediary payload 220 may include provisioning data locator 222, provisioning data authentication data 224, and signature 228. The provisioning data locator 222 may include any type of information (e.g., a URL, a link, an identifier, a file path, a network path, or the like) that would further direct an endpoint device (e.g., endpoint device 136) that is being onboarded to provisioning data (including the bootable installers and/or disk images). For example, the provisioning data locator 222 may include a URL to the provisioning data management system 142 (and/or a file path to a location within the provisioning data management system 142 or the intermediary payload system 141 in which the provisioning data is stored).

The provisioning data authentication data 224 may include any type of security and/or encryption related data that can be used to authenticate a validity (and integrity) of the provisioning data (including the bootable installers and/or disk images) referenced by the provisioning data locator 222. For example, the provisioning data authentication data 224 may be a hash, a checksum, a digest, a trusted public key (e.g., if the provisioning data is signed using a secret key), or the like of the provisioning data (including the bootable installers and/or disk images). More specifically, in one example, the provisioning data authentication data 224 may be a hash of an ISO image to be used by an endpoint device to complete BMO. As discussed below in reference to FIGS. 2B and 2C, the provisioning data authentication data 224 may be used by the endpoint device to verify the provisioning data (including the bootable installers and/or disk images) back to the root of trust 200.

Signature 228 may be similar to signature 198 of work order 196 shown in FIG. 1H. In particular, signature 228 may be signed by a secret key that is the private key of the public private key pair associated with the trusted public key 214 included in the BMO payload 210. Said another way, just like how (as shown in FIG. 1H) public key of owner entity 190 is used to verify the signature 198 of work order 196, trusted public key 214 is used to verify the signature 228 in the intermediary payload 220. This advantageously allows the endpoint device to effectively still be able to verify the intermediary payload back to the root of trust 200 (which is discussed in more detail below in FIGS. 2B and 2C).

In embodiments, the intermediary payload 220 may be stored in a storage of the intermediary payload system 141. The intermediary payload system 141 may be implemented as a separate and distinct computing device (e.g., as an independent computing device) (or computing devices) from computing devices used to implement the provisioning data management system 142, orchestrator 132, rendezvous system 120, voucher management system 110, and manufacturer system 100.

Figure 2A:
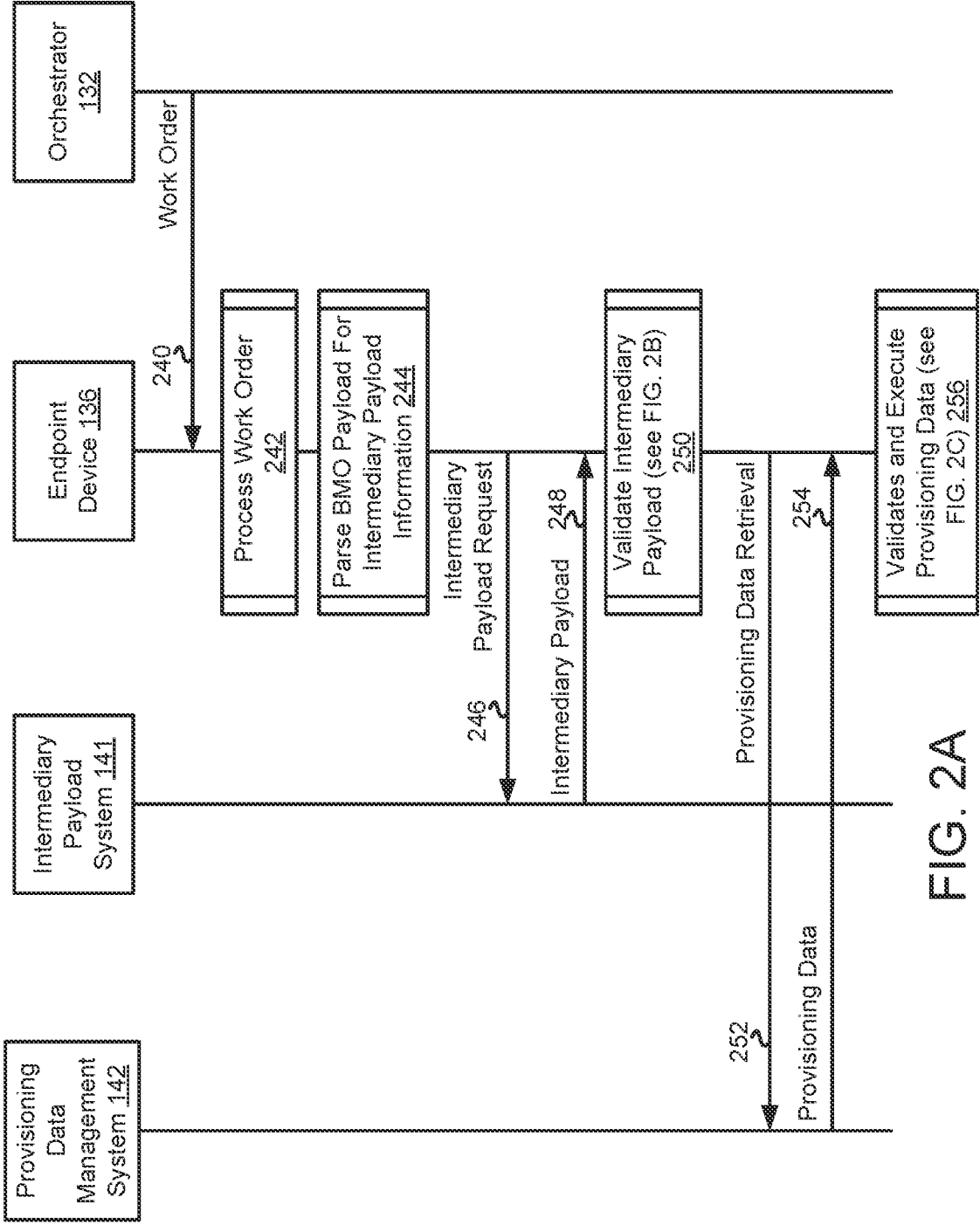
FIGS. 2A-2C show interaction diagrams in accordance with an embodiment.
Figure 2B:
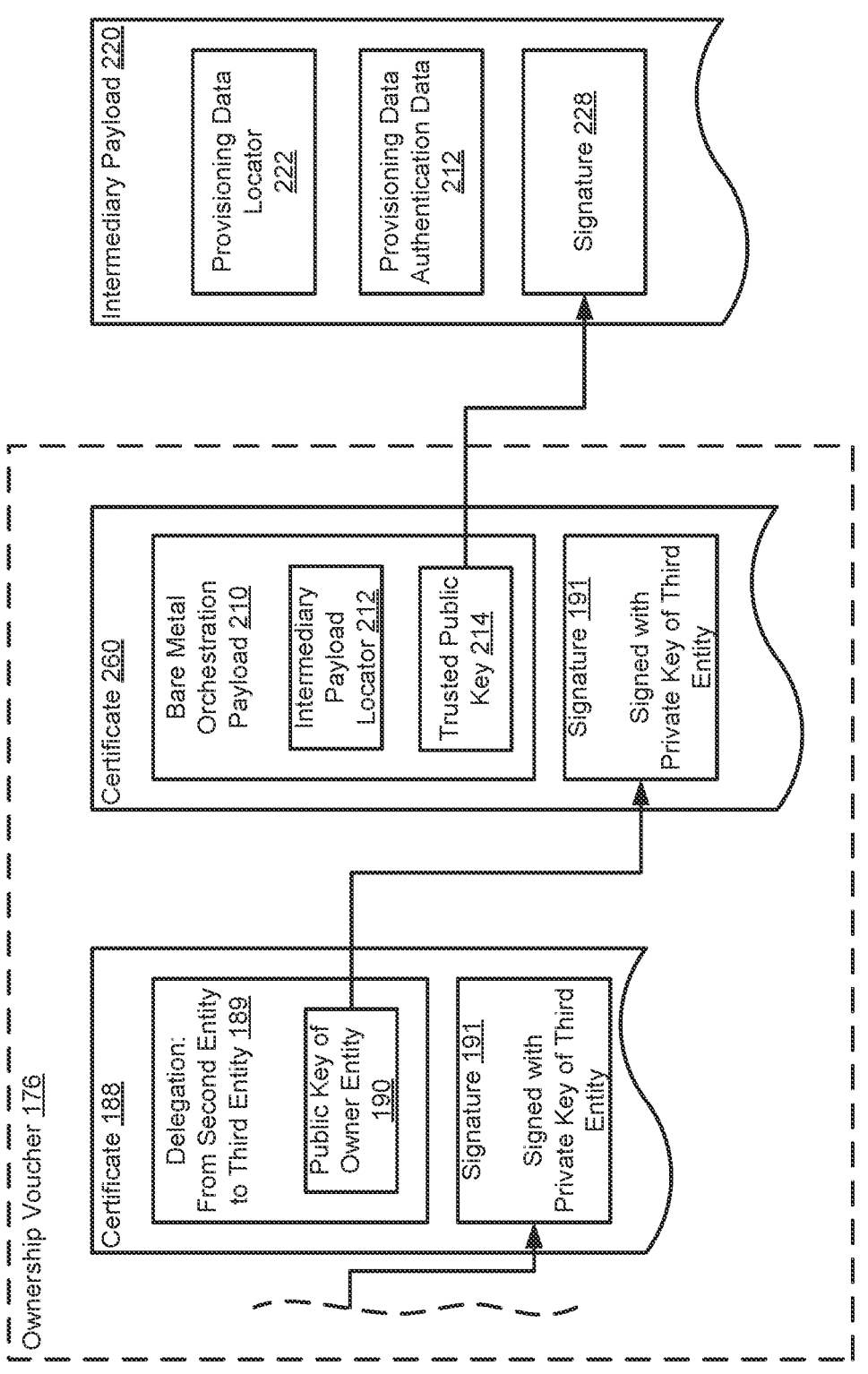
Figure 2C:
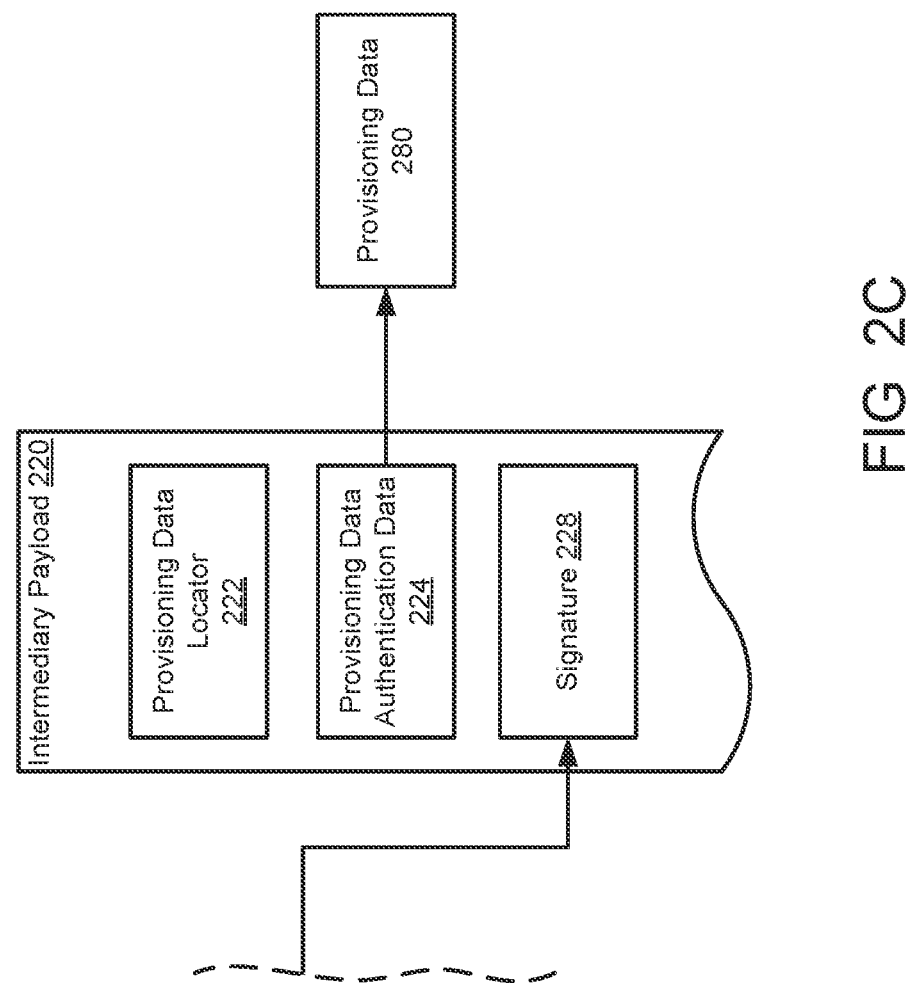

To further clarify embodiments disclosed herein, interactions diagrams in accordance with an embodiment are shown in FIGS. 2A-2C. These interactions diagrams may illustrate how data may be obtained and used within the system of FIGS. 1A-1I.

In the interaction diagrams, processes performed by and interactions between components of a system in accordance with an embodiment are shown. In the diagrams, components of the system are illustrated using a first set of shapes (e.g., 132, 136, 140, 142, etc.), located towards the top of each figure. Solid lines descend from this first set of shapes to indicate that the devices are operating during the corresponding period of time.

Processes performed by the components of the system are illustrated using a second set of shapes (e.g., 242, 244, 250, 256, etc.) superimposed over these lines. Interactions (e.g., communication, data transmissions, etc.) between the components of the system are illustrated using a third set of shapes (e.g., 240, 246, 248, 254, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 240 may occur prior to the interaction labeled as 244. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate processes and interactions that may occur during onboarding of an endpoint device. In particular, during BMO of the endpoint device.

To onboard endpoint device 136, orchestrator 132 may, at interaction 240, send a work order (e.g., work order 196 of FIG. 1H) to endpoint device 136. At this point in time, the orchestrator 132 has already established that it has authority over the endpoint device 136 (namely, interaction 240 happens after rendezvous system 120 has directed endpoint device to orchestrator 132 and orchestrator 132 has used information included in the ownership voucher (or the like) to establish the authority).

For example, orchestrator 132 may provide endpoint device 136 with the ownership voucher and/or other information to enable endpoint device 136 to ascertain whether orchestrator 132 has authority over endpoint device 136. To do so, endpoint device 136 may attempt to validate certificate chains and delegation statements to establish a chain of delegation of authority from the root of trust to orchestrator 132 (e.g., the delegation statements may identify a particular public key for which orchestrator 132 controls a corresponding private key). Endpoint device 136 may issue various challenges (e.g., signing challenges) to orchestrator 132, and endpoint device 136 may test the signed responses to the challenges using the particular public key. If the signed responses can be validated using the public key, then endpoint device 136 may conclude that orchestrator 132 has authority over it.

Once successfully validated as having authority over it, endpoint device 136 may continue to participate in the onboarding by, for example, evaluating the trustworthiness of signed work orders issued by orchestrator 132 (e.g., the singed work order received at interaction 240), and complying with any signed work orders that can be validated as having been signed with the private key corresponding to the particular public key. As discussed below in the operations of FIG. 2A, these work orders may cause endpoint device 136 to, for example, modify its configuration, install/remove software, enable/disable various hardware components, establish accounts for end users, and/or perform other operations as directed by orchestrator 132. The aforementioned operations may place endpoint device 136 in an operating state specified by the owner of endpoint device 136.

In operation 242, after receiving the work order at interaction 240, endpoint device 136 may attempt to validate the work order. The endpoint device 136 may attempt to validate the work order using the cryptographic data validation process shown in FIGS. 1G-1H. Only if the work order is validated will the endpoint device 136 process any statements (e.g., statements 197 of FIG. 1H) included in the work order.

In embodiments, the statements in the work order may include instructions for the endpoint device 136 to retrieve provisioning data (including the bootable installers and/or disk images) to complete BMO of the endpoint device 136 as part of the onboarding of the endpoint device 136. For example, the statements in the work order may include instructions for the endpoint device to use a BMO payload (e.g., BMO payload 210 of FIG. 1J) in an ownership voucher (e.g., ownership voucher 176 of FIG. 1F) of the endpoint device 136 to retrieve the provisioning data (including the bootable installers and/or disk images).

In embodiments, the ownership voucher may already be stored in the endpoint device 136 before the work order was received at interaction 240. For example, the ownership voucher may already have been provided to the endpoint device (e.g., by orchestrator 132 or voucher management system 110) when the endpoint device 136 is validating the authority of the orchestrator 132 in cooperation with the rendezvous system. Alternatively, the ownership voucher may be provided with the work order (by orchestrator 132) at interaction 240. Further, the endpoint device 136 may receive the ownership voucher from any source and at any time at or before interaction 240 using any means without departing from the scope of embodiments disclosed herein.

Even further, in embodiments, the ownership voucher may be provided (e.g., to endpoint device 136) without the provisioning data, the provisioning data locator, and the provisioning data authentication data within other content of the ownership voucher beside the BMO payload. Said another way, beside the intermediary payload locator 212 and the trusted public key 214 included in the BMO payload 210, no other information regarding the provisioning data may be included in the ownership voucher.

Similarly, in embodiments, the work order (received at interaction 240) is also provided without the provisioning data, the provisioning data locator, and the provisioning data authentication data.

In operation 244, after validating and processing the work order in operation 242, the endpoint device 136 parses the BMO payload (within the ownership voucher) to obtain intermediary payload information (namely, the intermediary payload locator 212 of FIG. 1J).

Using the intermediary payload locator 212, the endpoint device 136, at interaction 246, sends a request (e.g., intermediary payload request) to the intermediary payload system 141 to retrieve the intermediary payload (e.g., intermediary payload 220 of FIG. 1K) specified by the intermediary payload locator 212. At interaction 248, the intermediary payload system 141 provides (e.g., transmits) the intermediary payload to endpoint device 136.

In operation 250, the endpoint device 136 validates an integrity of the intermediary payload obtained at interaction 248. This validation is done to determine whether the intermediary payload can be trusted (e.g., the intermediary payload is issued by someone with authority or associated with someone with authority to modify/configure the endpoint device 136).

In particular, turning first to FIG. 2B, the endpoint device 136 may use the trusted public key 214 included in the BMO payload 210 to validate a signature (e.g., signature 228) included in the intermediary payload 220. The BMO payload 210, in this example, is shown to be included in a certificate 260 that follows certificate 188 of FIG. 1G. The certificate 260 may be validated using the public key of owner entity 190 included in certificate 188.

In embodiments, the validation of the signature 228 in intermediary payload 220 may be identical to the validation of signature 191 using public key of owner entity 190 as discussed above in reference to FIGS. 1G-1H. As shown in FIG. 2B, such validation advantageously allows the endpoint device 136 to establish a chain of delegations back to the root of trust (e.g., root of trust 160 of FIG. 1G that connects to certificate 188 shown in FIG. 2B), thus ensuring that the intermediary payload 220 is provided by a trusted entity.

Returning back to FIG. 2A, after validating the intermediary payload in operation 250, the endpoint device 136 may, at interaction 252, retrieve provisioning data (e.g., via a request, a command, an application programming interface (API) call, or the like) from the provisioning data management system 142. To retrieve the provisioning data (including the bootable installers and/or disk images), the endpoint device 136 may use provisioning data locator 222 included in the validated intermediary payload. Namely, the provisioning data locator 222 will specify: (i) a location of the provisioning data management system 142 within the system (e.g., the system of FIG. 1A); and (ii) the exact storage of location of the provisioning data in (and the exact provisioning data to be retrieve from) the provisioning data management system 142.

At interaction 254, the endpoint device 136 obtains (e.g., receives) the provisioning data (including the bootable installers and/or disk images) from the provisioning data management system 142.

At operation 256, the endpoint device 136 validates (e.g., validates an integrity/trust) of the provisioning data retrieved at interaction 254. Specifically, turning to FIG. 2C, the endpoint device 136 may use the provisioning data authentication data 224 included in the validated intermediary payload 220 to validate the provisioning data (e.g., provisioning data 280 of FIG. 2C). In embodiments, this provisioning data 280 may include bootable installers and/or disk images and other necessary/applicable provisioning data that could be used by the endpoint device 136 to complete a BMO (and/or even an entire onboarding) of the endpoint device 136.

As one example, assume that the provisioning data 280 is an ISO image and that the provisioning data authentication data 224 is a hash of the ISO image. The endpoint device 136 may use the hash of the ISO image to verify whether the ISO image should be trusted. If the ISO image can be successfully validated using the hash, the endpoint device 136 will know that the ISO image is safe to use. As shown in FIG. 2C (in connection with FIGS. 2B and 1G-1H), such validation advantageously allows the endpoint device 136 to establish a chain of delegations back to the root of trust (e.g., root of trust 160 of FIG. 1G that connects to certificate 188 shown in FIG. 2B), thus further ensuring that the provision data 280 is provided by a trusted entity (e.g., that the provisioning data 280 is secure).

Turning back to FIG. 2A, once the provisioning data is successfully validated, the endpoint device 136 may executed the validated provisioning data to complete BMO of the endpoint device 136 (and continue on to complete further onboarding if additional application configurations are required after the BMO) of the endpoint device 136. If application configurations are not required, completion of the BMO completes the onboarding the endpoint device 136.

Thus, an improved system where an intermediary payload is used (instead of the ownership voucher) to store the actual provisioning data (including the bootable installers and/or disk images) and/or just the authentication data of the provisioning data can be obtained. In embodiments, should any of the validations at operations 250 and 256 fail, the endpoint device 136 may notify the orchestrator 132 of the error and stop the onboarding until human intervention is provided. Said another way, the intermediary payload and the provisioning data are used by the endpoint device 136 only if they are able to be successfully validated by the endpoint device 136 (using the trusted public key and provisioning data authentication data, respectively).

Any of the processes illustrated in FIGS. 2A-2C using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated in FIGS. 2A-2C using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions illustrated in FIGS. 2A-2C may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3:
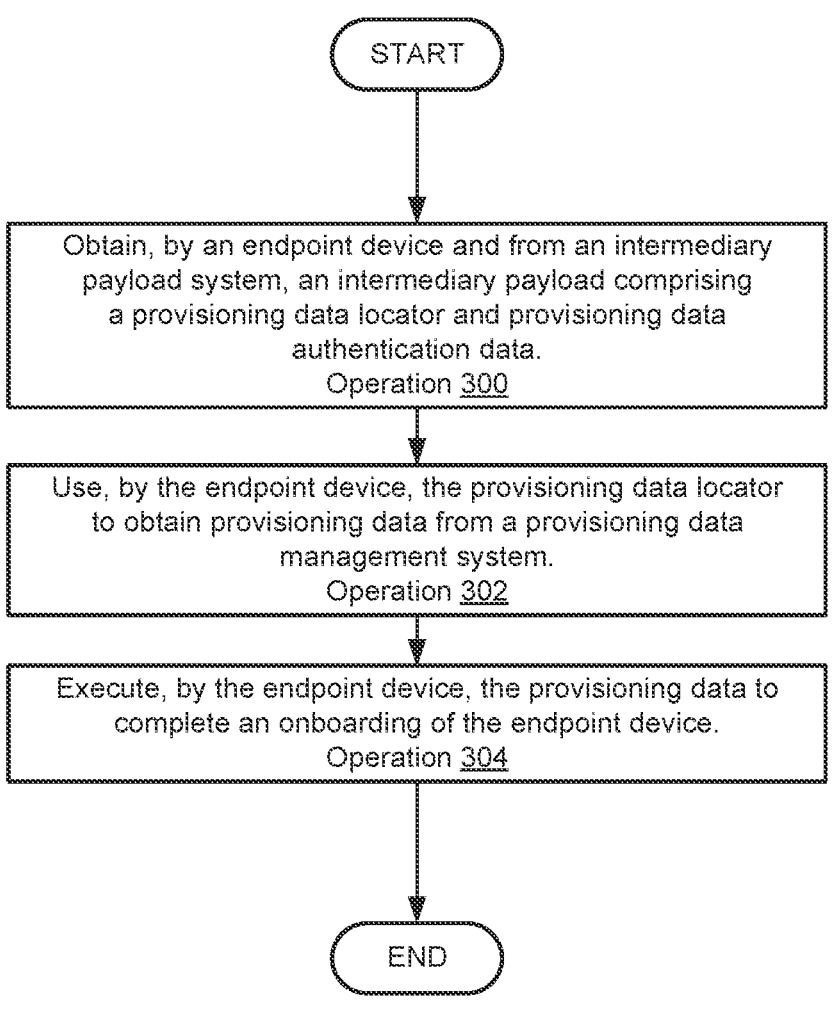
FIG. 3 shows a flow diagram illustrating a method in accordance with an embodiment.

As discussed above, the components of FIG. 1A may perform various methods to onboarding endpoint devices. FIG. 3 illustrates a method that may be performed by the components of the system of FIGS. 1A-1K. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for performing an onboarding in accordance with an embodiment is shown. The method may be performed by any of the components of the system shown in FIG. 1A.

As discussed above in reference to FIG. 2A, prior to operation 300, the endpoint device may, at least: (i) validate and onboard to an orchestrator; (ii) receive an ownership voucher for the endpoint device that contains the BMO; (iii) receive a work order from the validated orchestrator (e.g., at interaction 240 of FIG. 2A); (iv) process and validate the work order (e.g., operation 242 of FIG. 2A); and (v) parse the BMO payload for the intermediary payload information (e.g., operation 244 of FIG. 2A).

In operation 300, as discussed above in reference to FIG. 2A (namely, operation 244 and interactions 246-248 of FIG. 2A), the endpoint device may obtain (e.g., from an intermediary payload system remote to the endpoint device) an intermediary payload comprising a provisioning data locator and provisioning data authentication data.

In particular, the endpoint device may use an intermediary payload locator (e.g., intermediary payload locator 212 of FIG. 1J) to locate the intermediary payload system and the intermediary payload stored within the intermediary payload system.

At operation 302, as discussed above in reference to FIG. 2A (namely, operation 250 and interactions 252-254 of FIG. 2A), the endpoint device may use the provisioning data locator from the intermediary payload to obtain provisioning data from a provisioning data management system that is remote to the endpoint device.

As discussed above in reference to FIGS. 2A-2B, prior to using the provisioning data locator (e.g., data included in the intermediary payload), the endpoint device must first validate an integrity of the intermediary payload (e.g., back to a root of trust established for the endpoint device) using a private public key pair (e.g., trusted public key 214 in BMO payload 210 and the signature 228 in intermediary payload 220).

If the intermediary payload cannot be validated by the endpoint device, the process may end following operation 300. Else, the process proceeds with operation 302.

At operation 304, as discussed above in reference to FIG. 2A (namely, operation 250 of the FIG. 2A) the endpoint device may execute the provisioning data to complete an onboarding of the endpoint device.

As discussed above in reference to FIGS. 2A and 2C, prior to using (e.g., executing) the provisioning data, the endpoint device must first validate an integrity of the provisioning data (e.g., back to a root of trust established for the endpoint device) using the provisioning data authentication data included in the validated intermediary payload.

If the provisioning data cannot be validated by the endpoint device, the process may end following operation 302 (e.g., the endpoint device will not execute the provisioning data). Else, the endpoint device executes the provisioning data in operation 302.

The process may end following operation 304.

In embodiments, the process discussed in FIG. 3 may be executed as part of an initial onboarding of the endpoint device (e.g., an onboarding of the endpoint device to deployment 130 of FIG. 1A after the endpoint device is delivered to an owner of the deployment 130 from a manufacturer, reseller, and/or any other intermediate owner of the endpoint device). Prior to this onboarding, the endpoint device may be in a state where the endpoint device is devoid of any computing resources (e.g., hardware/software loadout, pieces of software, configuration settings, hardware component updates, or the like) necessary for the endpoint device to provide (e.g., implement) any of the computer-implemented services desired by the owner of deployment 130.

Additionally, in embodiments, multiple meta payloads (e.g., intermediary payloads) may be specified (e.g., referenced) in the BMO payload 222. However, each of these meta payloads must be successfully validated (e.g., by the endpoint device) before data stored within these meta payloads can be used. Similarly, each meta payload may specify (e.g., reference) multiple provisioning data (each provisioning data may be stored in different locations and/or systems). Again, each of these specified provisioning data must be successfully validated (e.g., by the endpoint device) before these provisioning data can be used.

Figure 4:
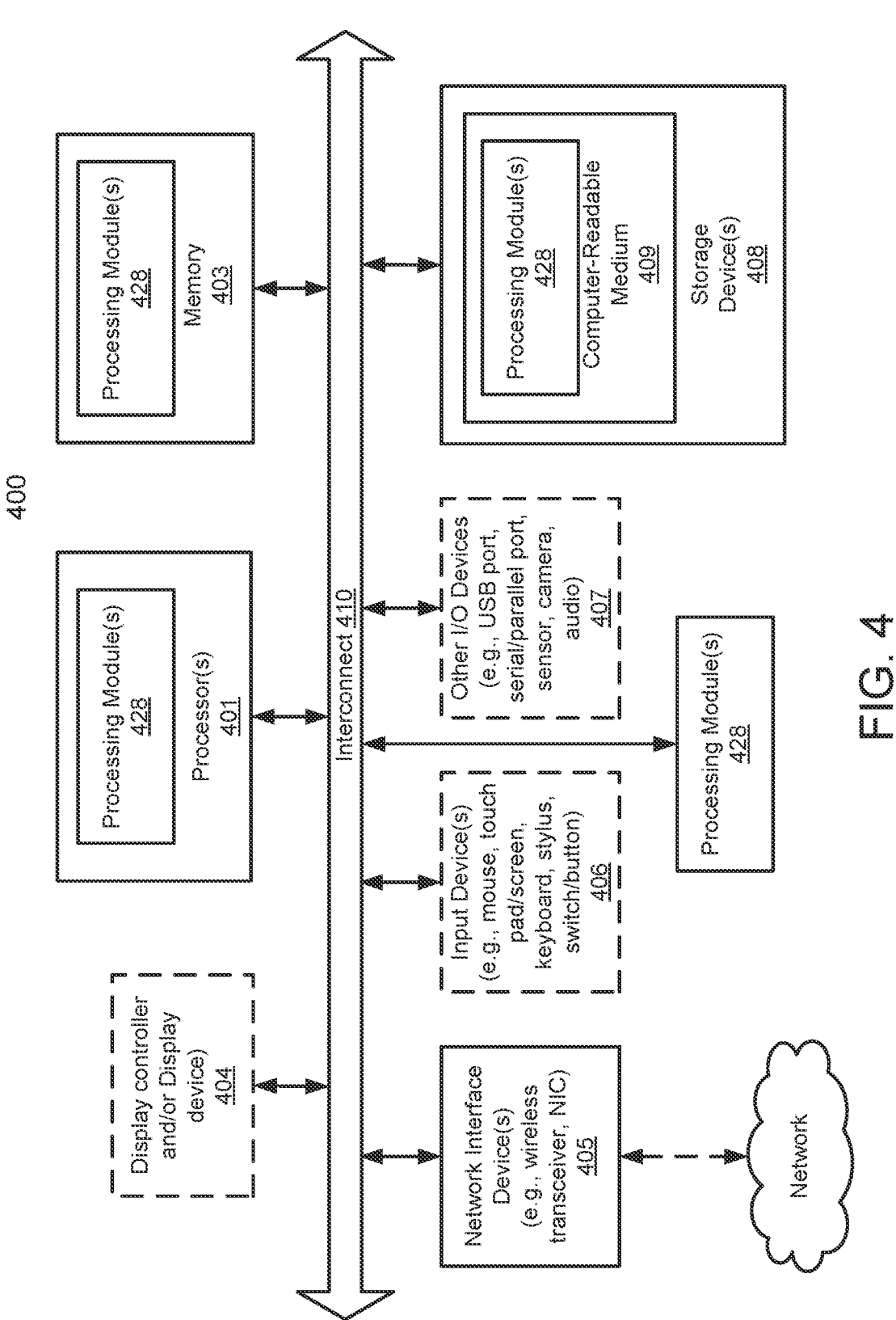
FIG. 4 shows a block diagram illustrating a data processing system in accordance with an embodiment.

Any of the components illustrated in FIGS. 1A-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing an endpoint device of endpoint devices in a deployment, the method comprising:

during an onboarding of the endpoint device that occurs after the endpoint device has been delivered to a final owner facility from a manufacturer facility or from an intermediate owner facility, and by the endpoint device:

obtaining, through a network connection and from an intermediary payload system remote to the endpoint device, an intermediary payload comprising a provisioning data locator and provisioning data authentication data, the intermediary payload being a first digital certificate and the provisioning data locator being first digital data stored in the first digital certificate, and obtaining the intermediary payload comprises:

obtaining, from a bare metal orchestration (BMO) payload included in an ownership voucher of the endpoint device, an intermediary payload locator, wherein the ownership voucher is a second digital certificate that comprises ownership information of the endpoint device, and the BMO payload is second digital data that is further stored in the second digital certificate along with the ownership information; and using the intermediary payload locator to locate the intermediary payload system and the intermediary payload within the intermediary payload system;

using the provisioning data locator to obtain provisioning data from a provisioning data management system remote from the endpoint device, the provisioning data comprising bootable installers for installing an operating system (OS) onto the endpoint device, and the ownership voucher and the intermediary payload do not include a copy of the provisioning data such that the endpoint device must obtain the provisioning data from the provisioning data management system using the intermediary payload locater stored in the BMO included in the ownership voucher; and executing the provisioning data to complete the onboarding of the endpoint device, wherein prior to completing the onboarding the endpoint device, the endpoint device is incapable of providing any computer implemented services.

2. The method of claim 1, wherein the intermediary payload is signed using a secret key, and prior to using the provisioning data locator to obtain the provisioning data:

obtaining a trusted public key associated with the intermediary payload from the BMO payload; and determining that the trusted public key is referenced by the intermediary payload signed using the secret key to validate an integrity of the intermediary payload.

3. The method of claim 2, wherein obtaining the provisioning data comprises using the provisioning data locator to locate the provisioning data management system and the provisioning data within the provisioning data management system; and after obtaining the provisioning data from the provisioning data management system, using the provisioning data authentication data to validate the provisioning data obtained from the provisioning data management system.

4. The method of claim 3, wherein the provisioning data is only executed by the endpoint device after the provisioning data is successfully validated using the provisioning data authentication data.

5. The method of claim 3, wherein the provisioning data authentication data is at least one of a hash, a digest, or a checksum of the provisioning data.

6. The method of claim 3, wherein the provisioning data locator comprises a uniform resource locator (URL) that that the endpoint device uses to reach a location of the provisioning data and the intermediary payload locator comprises a URL that that the endpoint device uses to reach a location of the intermediary payload.

7. The method of claim 1, wherein the ownership voucher is provided to the endpoint device by an orchestrator controlled by an owner of the endpoint device, and the ownership voucher is provided without the provisioning data locator, and the provisioning data authentication data within other content of the ownership voucher beside the BMO payload.

8. The method of claim 7, further comprising:

prior to obtaining the intermediary payload and by the endpoint device:

obtaining, from the orchestrator, a work order comprising instructions for onboarding the endpoint device using the provisioning data; and using the BMO payload in the ownership voucher instead of data included in the work order to obtain the intermediary payload.

9. The method of claim 8, wherein the work order is also provided without the provisioning data, the provisioning data locator, and the provisioning data authentication data in the work order.

10. The method of claim 7, wherein both of the provisioning data management system and the intermediary payload system are separate and distinct from the orchestrator.

11. The method of claim 10, wherein the provisioning data management system is remote to the intermediary payload system and the endpoint device.

12. A non-transitory machine-readable medium having instructions stored therein, which when executed by a processor of an endpoint device of endpoint devices in a deployment, cause the processor to perform operations for managing the endpoint device, the operations comprising:

during an onboarding of the endpoint device that occurs after the endpoint device has been delivered to a final owner facility from a manufacturer facility or from an intermediate owner facility, and by the endpoint device:

obtaining, through a network connection and from an intermediary payload system remote to the endpoint device, an intermediary payload comprising a provisioning data locator and provisioning data authentication data, the intermediary payload being a first digital certificate and the provisioning data locator being first digital data stored in the first digital certificate, and obtaining the intermediary payload comprises:

obtaining, from a bare metal orchestration (BMO) payload included in an ownership voucher of the endpoint device, an intermediary payload locator, wherein the ownership voucher is a second digital certificate that comprises ownership information of the endpoint device, and the BMO payload is second digital data that is further stored in the second digital certificate along with the ownership information; and using the intermediary payload locator to locate the intermediary payload system and the intermediary payload within the intermediary payload system;

using the provisioning data locator to obtain provisioning data from a provisioning data management system remote from the endpoint device, the provisioning data comprising bootable installers for installing an operating system (OS) onto the endpoint device, and the ownership voucher and the intermediary payload do not include a copy of the provisioning data such that the endpoint device must obtain the provisioning data from the provisioning data management system using the intermediary payload locater stored in the BMO included in the ownership voucher; and executing the provisioning data to complete the onboarding of the endpoint device, wherein prior to completing the onboarding the endpoint device, the endpoint device is incapable of providing any computer implemented services.

13. The non-transitory machine-readable medium of claim 12, wherein the intermediary payload is signed using a secret key, and prior to using the provisioning data locator to obtain the provisioning data:

obtaining a trusted public key associated with the intermediary payload from the BMO payload; and determining that the trusted public key is referenced by the intermediary payload signed using the secret key to validate an integrity of the intermediary payload.

14. The non-transitory machine-readable medium of claim 13, wherein obtaining the provisioning data comprises using the provisioning data locator to locate the provisioning data management system and the provisioning data within the provisioning data management system; and after obtaining the provisioning data from the provisioning data management system, using the provisioning data authentication data to validate the provisioning data obtained from the provisioning data management system.

15. An endpoint device, comprising:

a processor; and a memory coupled to the processor to store instructions, which when executed by the processor, cause the endpoint device to perform operations for onboarding, the operations comprising:

during an onboarding of the endpoint device that occurs after the endpoint device has been delivered to a final owner facility from a manufacturer facility or from an intermediate owner facility, and by the endpoint device:

obtaining, through a network connection and from an intermediary payload system remote to the endpoint device, an intermediary payload comprising a provisioning data locator and provisioning data authentication data, the intermediary payload being a first digital certificate and the provisioning data locator being first digital data stored in the first digital certificate, and obtaining the intermediary payload comprises:

obtaining, from a bare metal orchestration (BMO) payload included in an ownership voucher of the endpoint device, an intermediary payload locator, wherein the ownership voucher is a second digital certificate that comprises ownership information of the endpoint device, and the BMO payload is second digital data that is further stored in the second digital certificate along with the ownership information; and using the intermediary payload locator to locate the intermediary payload system and the intermediary payload within the intermediary payload system;

using the provisioning data locator to obtain provisioning data from a provisioning data management system remote from the endpoint device, the provisioning data comprising bootable installers for installing an operating system (OS) onto the endpoint device, and the ownership voucher and the intermediary payload do not include a copy of the provisioning data such that the endpoint device must obtain the provisioning data from the provisioning data management system using the intermediary payload locater stored in the BMO included in the ownership voucher; and executing the provisioning data to complete the onboarding of the endpoint device, wherein prior to completing the onboarding the endpoint device, the endpoint device is incapable of providing any computer implemented services.

16. The endpoint device of claim 15, wherein the intermediary payload is signed using a secret key, and prior to using the provisioning data locator to obtain the
    provisioning data:
      obtaining a trusted public key associated with the
          intermediary payload from the BMO payload; and
      determining that the trusted public key is referenced by
          the intermediary payload signed using the secret key
          to validate an integrity of the intermediary payload.

17. The endpoint device of claim 16, wherein
obtaining the provisioning data comprises using the pro-
    visioning data locator to locate the provisioning data
    management system and the provisioning data within
    the provisioning data management system; and
after obtaining the provisioning data from the provision-
    ing data management system, using the provisioning
    data authentication data to validate the provisioning
    data obtained from the provisioning data management
    system.

18. The endpoint device of claim 17, wherein the provi-
sioning data is only executed by the endpoint device after the
provisioning data is successfully validated using the provi-
sioning data authentication data.

19. The endpoint device of claim 17, wherein the provi-
sioning data authentication data is at least one of a hash, a
digest, or a checksum of the provisioning data.

20. The endpoint device of claim 17, wherein the provi-
sioning data locator comprises a uniform resource locator
(URL) that specifies a location of the provisioning data and
the intermediary payload locator comprises a URL that
specifies a location of the intermediary payload.

\*    \*    \*    \*    \*